United States Patent
Lin (10) Patent No.: US 12,546,493 B1
(45) Date of Patent: Feb. 10, 2026

(54) MISTING FAN

(71) Applicant: Zhenji Lin, Puning (CN)

(72) Inventor: Zhenji Lin, Puning (CN)

( * ) Notice: Subject to any disclaimer, the term of this patent is extended or adjusted under 35 U.S.C. 154(b) by 0 days.

(21) Appl. No.: 19/267,572

(22) Filed: Jul. 13, 2025

(51) Int. Cl.
| | | |
|---|---|---|
| *F24F 6/14* | (2006.01) | |
| *F24F 6/00* | (2006.01) | |
| *F24F 7/007* | (2006.01) | |

(52) U.S. Cl.
CPC .............. *F24F 6/14* (2013.01); *F24F 7/007* (2013.01); *F24F 2006/008* (2013.01); *F24F 2006/146* (2013.01)

(58) Field of Classification Search
CPC ..................................... F24F 6/12; F24F 6/14
See application file for complete search history.

(56) References Cited

U.S. PATENT DOCUMENTS

| | | | | |
|---|---|---|---|---|
| 6,786,701 B1 * | 9/2004 | Huang | ............... | F24F 6/14 62/304 |
| 2011/0036926 A1 * | 2/2011 | Nunes | ............... | F24F 6/12 239/214 |

FOREIGN PATENT DOCUMENTS

CN   209586752 U   * 11/2019

OTHER PUBLICATIONS

CN209586752U Translation (Year: 2019).*

* cited by examiner

*Primary Examiner* — Schyler S Sanks (57) ABSTRACT

A misting fan includes a base, a fan bracket, a driving device and a misting assembly. One end of the fan bracket is arranged on the base and is rotatably connected to the base; a fan main body is arranged at another end of the fan bracket. The driving device is arranged on the base, is connected to the fan bracket, and is configured to drive the fan bracket to rotate. The misting assembly is arranged on the fan main body, and a misting direction of the misting assembly is the same as an air outlet direction of the fan main body. The misting fan can reduce the noise during the rotation of the misting fan.

18 Claims, 8 Drawing Sheets

MISTING FAN

TECHNICAL FIELD

The present disclosure relates to the technical field of fans, and in particular to, a misting fan.

BACKGROUND

A misting fan is cooling equipment that generates mists while blowing air. Water absorbs heat during evaporation, thereby reducing the temperature, increasing the relative humidity of air, reducing dust, and purifying air.

The existing misting fan is noisy during rotation.

SUMMARY

A main purpose of the present disclosure is to provide a misting fan, which aims to reduce the noise during the rotation of the misting fan.

In order to achieve the above object, the present invention provides a misting fan, which includes a base, a fan bracket, a driving device and a misting assembly.

One end of the fan bracket is arranged on the base and is rotatably connected to the base; a fan main body is arranged at another end of the fan bracket.

The driving device is arranged on the base, is connected to the fan bracket, and is configured to drive the fan bracket to rotate.

The misting assembly is arranged on the fan main body, and a misting direction of the misting assembly is the same as an air outlet direction of the fan main body.

In one embodiment, the base includes a first mounting seat and a second mounting seat.

An arc-shaped driven member is arranged on the first mounting seat.

One end of the second mounting seat is arranged on the first mounting seat and is rotatably connected to the first mounting seat; the driving device is arranged at one end of the second mounting seat opposite to the first mounting seat; a transmission member is arranged at an output end of the driving device; the transmission member is meshed with the arc-shaped driven member. The fan bracket is arranged at another end of the second mounting seat.

In one embodiment, a first accommodating cavity is formed in the first mounting seat; the arc-shaped driven member is arranged in the first accommodating cavity; the first accommodating cavity is provided with an avoidance slot at an edge of the arc-shaped driven member; a first mounting hole corresponding to an output end of the driving device is provided in one side of the first mounting seat opposite to the second mounting seat; the first mounting hole is communicated with the first accommodating cavity; the output end of the driving device extends out of the first mounting hole and the avoidance slot in sequence into the first accommodating cavity; and the transmission member is arranged at a tail end of the output end of the driving device.

In one embodiment, a second accommodating cavity is formed inside the second mounting seat; the driving device is arranged in the second accommodating cavity; a second mounting hole is provided in one side of the second mounting seat opposite to the first mounting seat; the second mounting hole is communicated with the second accommodating cavity; and the output end of the driving device is at least partially threaded out of the second mounting hole.

In one embodiment, a first mounting part is further arranged on the side of the second mounting seat opposite to the first mounting seat; a third mounting hole corresponding to the first mounting part is provided in the first mounting seat; and the first mounting part is rotatably connected to the third mounting hole.

In one embodiment, a support member is further arranged on one side of the second mounting seat opposite to the first mounting seat; a sliding chute is provided in the side of the first mounting seat opposite to the second mounting seat; and the support member is slidably connected to the sliding chute.

In one embodiment, the support member is a ball; a groove is further provided in the side of the second mounting seat opposite to the first mounting seat; the ball is arranged in the groove; a cross section of the sliding chute is arc-shaped to form a roller path; and the ball is in rolling connection with the roller path.

In one embodiment, the base further includes a stopper; the stopper includes a first convex part; the first convex part is arranged inside the third mounting hole in a penetrating manner and is rotatably connected to the third mounting hole; one end of the first convex part is detachably connected to the first mounting part; a first limiting part is arranged at another end of the first convex part; and an outer diameter of the first limiting part is greater than a diameter of the third mounting hole.

In one embodiment, a second convex part is arranged on one side of the first mounting part opposite to the first convex part; a first through hole is provided in the second convex part; the first convex part is provided with a second through hole corresponding to the first through hole; the second convex part is plugged into the second through hole; and the first through hole and the second through hole are configured to allow a wire to pass through.

In one embodiment, the base further includes a first connector; the first connector includes a first sleeve; a flange is arranged at one end of the first sleeve; the first sleeve is plugged into the third mounting hole; the flange abuts against an outer wall of the first mounting seat; and the first mounting part is plugged into the first sleeve and is rotatably connected to the first sleeve.

In one embodiment, the fan bracket includes a water tank and a third mounting seat.

A mounting slot is provided in one side of the second mounting seat away from the first mounting seat; one end of the water tank is detachably connected to the mounting slot.

The third mounting seat is arranged at another end of the water tank; the fan main body is mounted on the third mounting seat; a third accommodating cavity is formed inside the third mounting seat;

the misting assembly includes a spray head, a water inlet pipe, a water outlet pipe, a pump body, a controller, and a power source; the pump body and the power source are electrically connected to the controller; the pump body, the power source, and the controller are all arranged inside the third accommodating cavity; the spray head is arranged on the fan main body; the spray head is communicated with the pump body through the water outlet pipe; and the pump body is communicated with the water tank through the water inlet pipe.

In one embodiment, a second mounting part and a third mounting part are respectively formed on two sides of one end of the third mounting seat away from the water tank; and two sides of the fan main body are respectively rotatably connected to the second mounting part and the third mounting part.

In one embodiment, the misting assembly further includes a first branch pipe and a second branch pipe; two groups of spray heads are provided; the two groups of the spray heads are respectively arranged on the two sides of the fan main body; the first branch pipe and the second branch pipe are respectively arranged on the second mounting part and the third mounting part; one end of the first branch pipe is communicated with one group of spray heads, and another end of the first branch pipe is connected with the water outlet pipe; one end of the second branch pipe is communicated with the other group of spray heads; and another end of the second branch pipe is communicated with the water outlet pipe.

In one embodiment, the third mounting seat includes a first front shell and a first rear shell; the first front shell and the first rear shell are detachably connected; a first cavity and a second cavity are respectively formed inside the first front shell and the first rear shell; and the first cavity and the second cavity are enclosed to form the third accommodating cavity.

In one embodiment, a first extension part and a second extension part are formed on one side of the first front shell; a first accommodating slot and a second accommodating slot are respectively formed in the first extension part and the second extension part; the first accommodating slot and the second accommodating slot are communicated with the first cavity;

a third extension part and a fourth extension part are formed on one side of the first rear shell; a third accommodating slot and a fourth accommodating slot are respectively formed in the third extension part and the fourth extension part; the third accommodating slot and the fourth accommodating slot are communicated with the second cavity;

the first accommodating slot and the third accommodating slot are configured to store the first branch pipe; and the second accommodating slot and the fourth accommodating slot are configured to store the second branch pipe.

In one embodiment, the third mounting seat includes a water pump bracket; a first mounting position and a mounting column are formed inside the second cavity; the pump body is arranged inside the first mounting position; fourth mounting holes are provided in two ends of the water pump bracket; a threaded hole is provided in the mounting column; the water pump bracket is fastened to the first mounting position in a manner that a bolt is in threaded connection with the threaded hole through the mounting hole; and the water pump bracket abuts against the pump body.

In one embodiment, the fan main body includes a front fan shell and a rear fan shell; a second mounting position and a third mounting position are respectively arranged on two sides of the front fan shell; one group of spray heads are arranged in the second mounting position; and the other group of spray heads are arranged in the third mounting position.

In one embodiment, a check valve is arranged at a bottom of the first front shell; and the check valve is communicated with an internal space of the water tank.

In one embodiment, a water inlet is provided in one end of the first rear shell away from the water tank; a water injection channel is formed inside the first rear shell; a water outlet is provided in one end of the first rear shell close to the water tank; the water inlet, the water injection channel, and the water outlet are communicated in sequence; and the water outlet is communicated with an internal space of the water tank.

In one embodiment, the water tank is made of a light-transmittance material; and a light-emitting assembly is arranged on one side of the second mounting seat opposite to the water tank.

According to the technical solutions of the present disclosure, the arc-shaped driven member is arranged on the first mounting seat. One end of the second mounting seat is arranged on the first mounting seat and is rotatably connected to the first mounting seat. The driving device is arranged on one end of the second mounting seat opposite to the first mounting seat. The transmission member is arranged at the output end of the driving device. The transmission member is meshed with the arc-shaped driven member. The fan bracket is arranged at another end of the second mounting seat. This can achieve automatic reciprocating swinging or fixed-point rotation of the fan and has low noise in the meshing transmission between the arc-shaped driven member and the transmission member. With the smooth rotation, a silence experience of a user during use can be enhanced.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE EMBODIMENTS

The accompanying drawings in the embodiment of the present invention are combined, The technical scheme in the embodiment of the present invention is clearly and completely described, Obviously, the described embodiment is only a part of the embodiment of the present invention, but not all embodiments are based on the embodiment of the present invention, and all other embodiments obtained by ordinary technicians in the field on the premise of not doing creative work belong to the protection range of the present invention.

It should be noted that all directional indications (such as up, down, left, right, front, back . . . ) in the embodiments of the present invention are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present invention are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present invention.

In an existing misting fan, in addition to the noise problem, a fan bracket still has low rotation stability in a rotation process under the action of a driving device. For example, a fan main body will shake during rotation because of low fitting accuracy of or non-uniform force on rotatably connected components. As a result, accuracy of a misting direction of a misting assembly is affected, which leads to non-uniform distribution of a cooling range. Meanwhile, a traditional driving device is prone to rotation jamming due to wear and tear of a transmission member after prolonged operation, which not only reduces reliability of equipment operation, but also exacerbates energy loss and affects the overall service life of a fan. In addition, when the misting assembly rotates along with the fan main body, a connecting part between the misting assembly and a water supply pipeline may become loose or distorted due to repeated rotation, leading to an unstable misting pressure or even a water leakage problem. This will adversely affect normal use of the equipment and environmental cleaning.

To this end, the present disclosure provides a misting fan.

Figure 1:
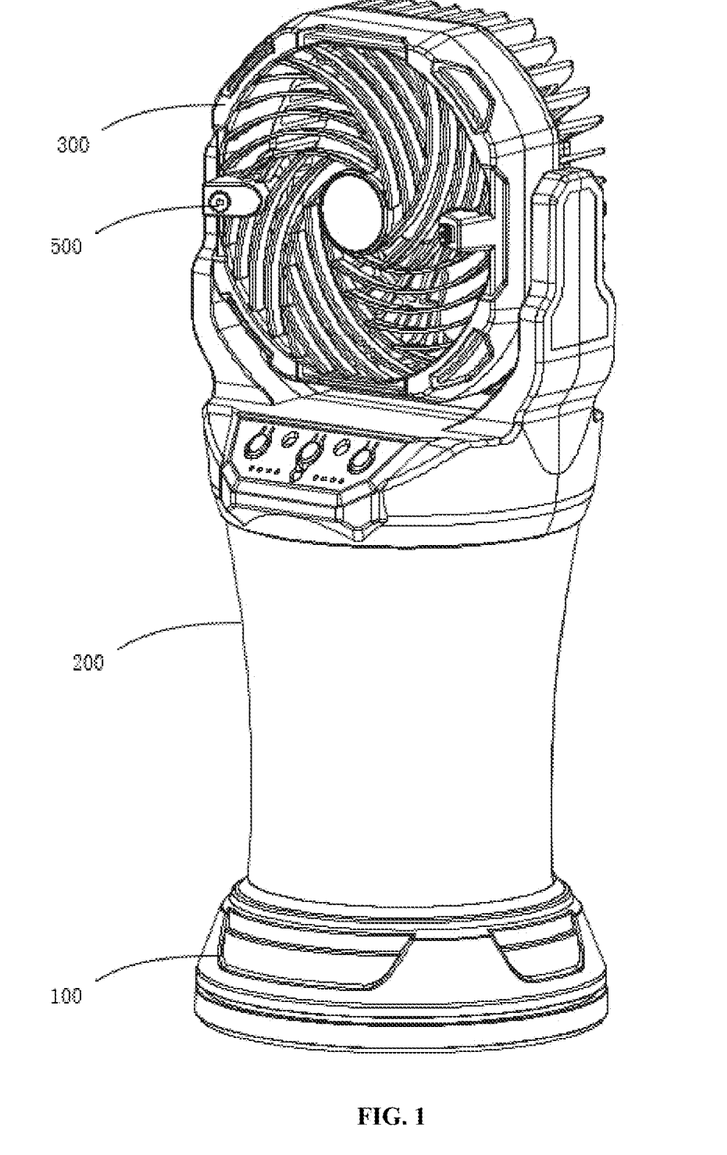
FIG. 1 is a schematic structural diagram of an embodiment of a misting fan according to the present disclosure.
Figure 2:
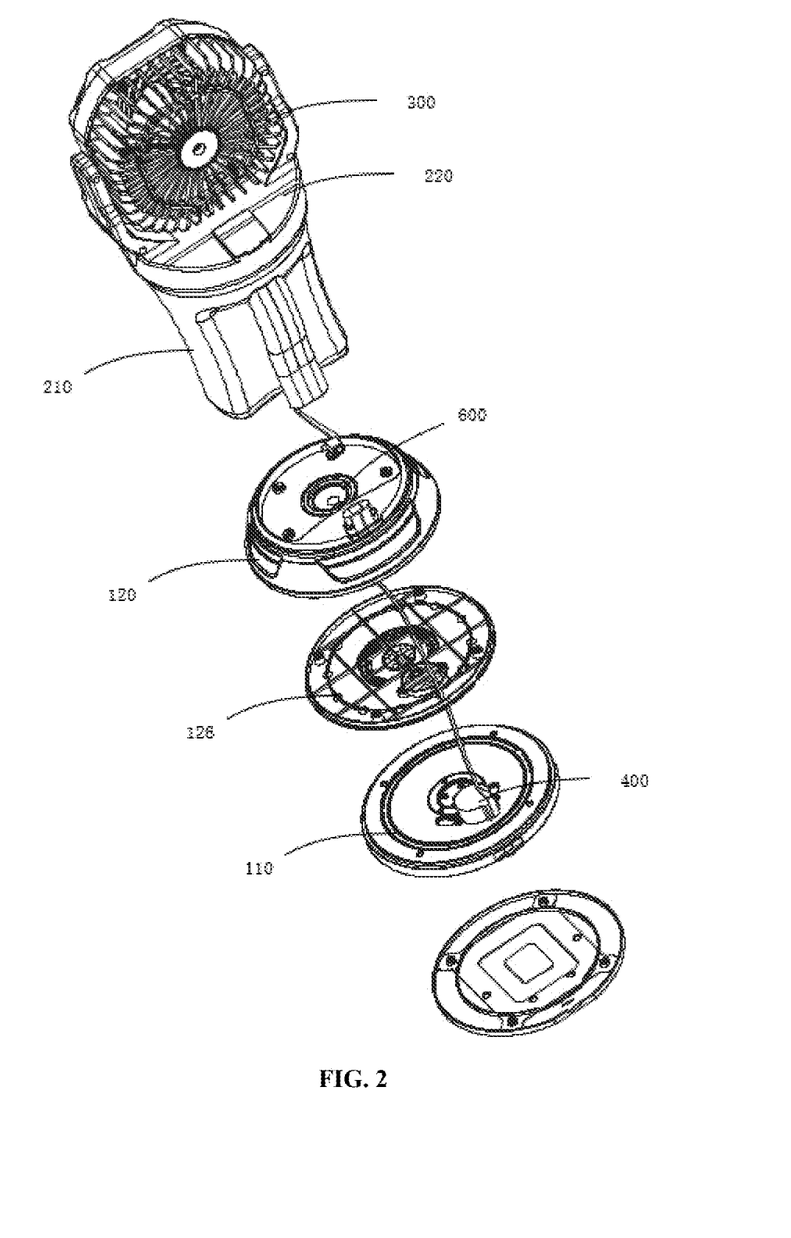
FIG. 2 is an exploded view of a viewing angle of a misting fan according to the present disclosure.
Figure 3:
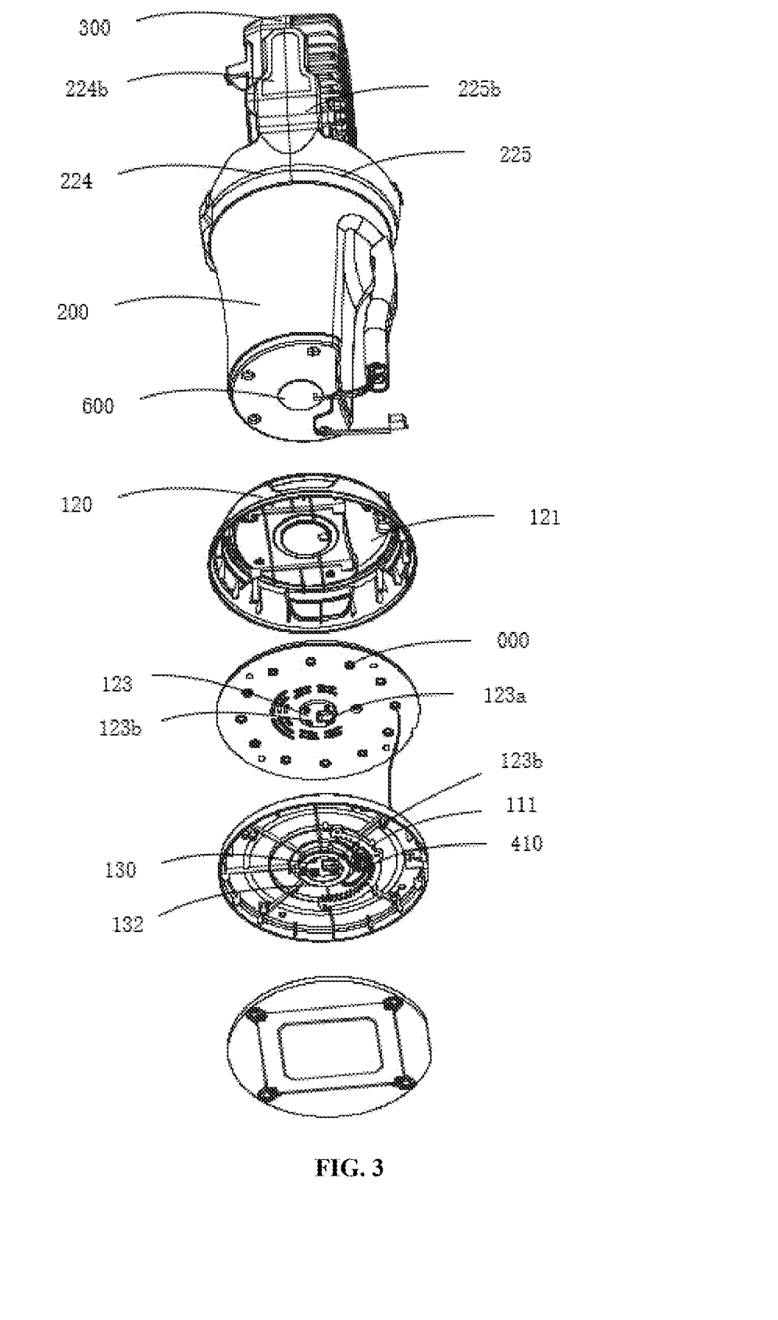
FIG. 3 is an exploded view of another viewing angle of a misting fan according to the present disclosure.

Referring to FIG. 1, in an embodiment of the present disclosure, the misting fan includes a base 100, a fan bracket 200, a driving device 400, and a misting assembly 500. One end of the fan bracket 200 is arranged on the base 100 and is rotatably connected to the base 100. A fan main body 300 is arranged at another end of the fan bracket 200. The driving device 400 is arranged on the base 100, is connected to the fan bracket 200, and is configured to drive the fan bracket 200 to rotate. The misting assembly 500 is arranged on the fan main body 300, and a misting direction of the misting assembly 500 is the same as an air outlet direction of the fan main body 300.

In this implementation, one end of the fan bracket 200 is rotatably connected to the base 100, and another end of the fan bracket 200 carries the fan main body 300. The driving device 400 is arranged on the base 100 and is directly associated with the fan bracket 200 to form a stable power transmission path. When the driving device 400 works, power generated by the driving device directly acts on the fan bracket 200, to drive the fan main body 300 and the misting assembly 500 to rotate synchronously. Since the misting direction of the misting assembly 500 and the air outlet direction of the fan main body 300 are consistent, mists can spread uniformly in an air flow direction of the fan during rotation, thereby ensuring a coverage balance of a cooling region.

The rotatably connected structure formed by the base 100 and the fan bracket 200 provides a basic support for the rotation of the fan main body 300. The transmission design of the driving device 400 reduces energy loss and mechanical vibration in a power transmission process. When the driving device 400 drives the fan bracket 200 to rotate, the fan main body 300 rotates synchronously, and internal fan blades generate an air flow. Water mists sprayed by the misting assembly 500 are diffused in a particular direction under the pushing of the air flow. A physical process of heat absorption by water evaporation is combined with an air supply process of the fan to achieve effects of cooling, humidification, and air purification. In this process, the rigid connection between the misting assembly 500 and the fan main body 300 ensures stability during rotation and avoids a shift of the misting direction caused by relative shaking. Meanwhile, the design of fit between the driving device 400 and a rotatably connected component effectively reduces rotation noise and improves smoothness of operation of the equipment.

The misting fan can implement stable angle adjustment during rotation, reduce the non-uniform misting problem caused by unstable rotation, optimize transmission efficiency of the driving device 400, and reduce mechanical wear and noise pollution. Due to the design in which the misting assembly 500 and the fan main body 300 are in the same direction, the water mists can be fully evaporated under the action of air flow, thereby enhancing a cooling effect, ensuring that air humidity adjustment and dust purification functions are stably performed, and providing a more reliable and efficient user experience.

Referring to FIG. 1 to FIG. 4, in an implementation, the base 100 includes a first mounting seat 110 and a second mounting seat 120. An arc-shaped driven member 111 is arranged on the first mounting seat 110. One end of the second mounting seat 120 is arranged on the first mounting seat 110 and is rotatably connected to the first mounting seat 110. The driving device 400 is arranged on one end of the second mounting seat 120 opposite to the first mounting seat 110. A transmission member 410 is arranged at an output end of the driving device 400. The transmission member 410 is meshed with the arc-shaped driven member 111. The fan bracket 200 is arranged at another end of the second mounting seat 120.

In this implementation, the base 100 employs a split design for the first mounting seat 110 and the second mounting seat 120. The first mounting seat 110 is provided with the arc-shaped driven member 111. One end of the second mounting seat 120 is rotatably connected to the first mounting seat 110, and another end carries the fan bracket 200. The driving device 400 is mounted at the end of the second mounting seat 120 opposite to the first mounting seat 110, and the transmission member 410 at the output end of the driving device is meshed with the arc-shaped driven member 111. When the driving device 400 is started, the transmission member 410 rotates under the action of power, thus forming meshing transmission with the arc-shaped driven member 111, thereby driving the second mounting seat 120 and the fan bracket 200 to rotate around the first mounting seat 110. Since the arc-shaped driven member 111 is set as an arc-shaped trajectory, the transmission member 410 can implement automatic reciprocating swinging of the fan bracket 200 when moving along the trajectory. If the driving device 400 is specifically controlled, fixed-point rotation can also be implemented.

Referring to FIG. 1 to FIG. 4, in an implementation, a first accommodating cavity 112 is formed in the first mounting seat 110; the arc-shaped driven member 111 is fixedly arranged in the first accommodating cavity 112; the first accommodating cavity 112 is provided with an avoidance slot 113 at an edge of the arc-shaped driven member 111; a first mounting hole 114 corresponding to an output end of the driving device 400 is provided in one side of the first mounting seat 110 opposite to the second mounting seat 120; the first mounting hole 114 is communicated with the first accommodating cavity 112; the output end of the driving device 400 extends out of the first mounting hole 114 and the avoidance slot 113 in sequence into the first accommodating cavity 112; and the transmission member 410 is arranged at a tail end of the output end of the driving device 400.

In this implementation, the internal structural design of the first mounting seat 110 further optimizes the operation performance and spatial layout of a transmission system. The arc-shaped driven member 111 is arranged inside the first accommodating cavity 112. In one aspect, the driven member is protected through an inner wall of the cavity, thereby preventing external dust and debris from entering a transmission region, reducing abnormal wear and jamming on the transmission member due to impurity interference, and ensuring rotation smoothness. In another aspect, this closed design can also to an extent block propagation of noise generated during the transmission to the outside, which further improves silence during use.

In conjunction with the first mounting hole 114, the avoidance slot 113 provided in the edge of the first accommodating cavity 112 provides a motion path for mounting and movement of the output end of the driving device 400 and the transmission member 410. The output end of the driving device 400 extends out of the first mounting hole 114 and enters the first accommodating cavity 112 through the avoidance slot 113, so that the transmission member 410 can be accurately meshed with the arc-shaped driven member 111. This mounting fit mode ensures stability and reliability of the transmission system, avoids a transmission offset, non-uniform force, and another problem that are caused by a mounting error, thus reducing the shaking of the fan bracket 200 during rotation and improving the accuracy of the misting direction of the misting assembly 500. Meanwhile, the proper spatial layout design makes the transmission between the driving device 400 and the driven member more compact and efficient, optimizes energy transmission efficiency, reduces energy consumption, prolongs the service life of the equipment, and brings a more stable and efficient user experience of the misting fan.

Referring to FIG. 1 to FIG. 4, in an implementation, a second accommodating cavity 121 is formed inside the second mounting seat 120; the driving device 400 is arranged in the second accommodating cavity 121; a second mounting hole 122 is provided in one side of the second mounting seat 120 opposite to the first mounting seat 110; the second mounting hole 122 is communicated with the second accommodating cavity 121; and the output end of the driving device 400 is at least partially threaded out of the second mounting hole 122.

In this implementation, the structural design of the second mounting seat 120 further perfects the overall performance of the misting fan. The driving device 400 is arranged inside the second accommodating cavity 121. First, a good protection space is provided for the driving device 400, so that impurities such as external dust and water vapor are isolated, and are prevented from entering the driving device 400 to affect normal operation of a core component such as a motor and a gear. This effectively reduces a probability of failure caused by component contamination and prolongs the service life of the driving device 400. Meanwhile, a closed environment of the second accommodating cavity 121 can also play a blocking role in noise generated during operation of the driving device 400. When the closed environment and the noise reducing design of the first mounting seat 110 for the transmission member are combined, a silence effect during operation of the fan is further enhanced.

The design of communication between the second mounting hole 122 and the second accommodating cavity 121 provides a channel for extension of the output end of the driving device 400, to ensure that the output end can smoothly extend out and achieve precise meshing with the transmission member 410 and the arc-shaped drive member 111 in the first mounting seat 110. The cooperation of the structures ensures the stability and accuracy of power transmission and avoids unsmooth transmission blockage or abnormal wear caused by a mounting shift of the output end, so that the fan bracket 200 can rotate steadily under the driving of the driving device 400, to reduce the shaking. In addition, the structural design of the second mounting seat 120 further optimizes an internal spatial layout of the misting fan and makes the components mounted in a compact and orderly manner. While ensuring function implementation, it reduces an overall volume, makes the product more compact and portable, and improves use convenience and user experience.

Referring to FIG. 1 to FIG. 4, specifically, in an implementation, a first mounting part 123 is further arranged on the side of the second mounting seat 120 opposite to the first mounting seat 110; a third mounting hole 124 corresponding to the first mounting part 123 is provided in the first mounting seat 110; and the first mounting part 123 is rotatably connected to the third mounting hole 124.

Referring to FIG. 1 to FIG. 4, in an implementation, a support member 125 is further arranged on one side of the second mounting seat 120 opposite to the first mounting seat 110; a sliding chute 115 is provided in the side of the first mounting seat 110 opposite to the second mounting seat 120; and the support member 125 is slidably connected to the sliding chute 115. Specifically, the support member 125 is a ball; a groove 126 is further provided in the side of the second mounting seat 120 opposite to the first mounting seat 110; the ball is arranged in the groove 126; a cross section of the sliding chute 115 is arc-shaped to form a roller path; and the ball is in rolling connection with the roller path.

In this implementation, the ball and sliding chute 115 cooperation structure between the second mounting seat 120 and the first mounting seat 110 can significantly improve the rotation performance of the misting fan. When a traditional fan rotates, due to large friction between connected components, noise is generated, and rotation jamming easily occurs, which affects overall stability. In this design, the ball is arranged inside the groove 126 of the second mounting seat 120 and forms a rolling fit with the sliding chute 115 on the arc-shaped cross section of the first mounting seat 110. When the driving device 400 drives the second mounting seat 120 to rotate, the ball can roll flexibly in the roller path.

This rolling connection mode changes from surface contact to point contact. Compared with traditional sliding friction, this mode greatly reduces a frictional force between the second mounting seat 120 and the first mounting seat 110. The decrease of the frictional force makes the fan bracket 200 rotate more smoothly, reduces energy loss caused by friction, improves transmission efficiency of the driving device 400, reduces a rate of wear of a component, and prolongs the service life of the equipment. Furthermore, this also effectively suppresses generation of rotation noise, thus creating a quieter usage environment for a user. Meanwhile, the close fit between the ball and the arc-shaped roller path can provide a stable support force for the second mounting seat 120, to ensure that the second mounting seat is balanced during rotation and avoid shaking or shift, thus ensuring stability of the fan main body 300 and the misting assembly 500 during rotation, making the misting direction accurate and controllable and enhancing effects of cooling, humidification, and air purification.

Referring to FIG. 1 to FIG. 4, in an implementation, the base 100 further includes a stopper 130; the stopper 130 includes a first convex part 131; the first convex part 131 is arranged inside the third mounting hole 124 in a penetrating manner and is rotatably connected to the third mounting hole 124; one end of the first convex part 131 is detachably connected to the first mounting part 123; a first limiting part 132 is arranged at another end of the first convex part 131; and an outer diameter of the first limiting part 132 is greater than a diameter of the third mounting hole 124.

In an implementation, a second convex part 123*a* is arranged on one side of the first mounting part 123 opposite to the first convex part 131; a first through hole 123*b* is provided in the second convex part 123*a*; the first convex part 131 is provided with a second through hole 131*a* corresponding to the first through hole 123*b*; the second convex part 123*a* is plugged into the second through hole 131*a*; and the first through hole 123*b* and the second through hole 131*a* are configured to allow a wire to pass through.

Referring to FIG. 1 to FIG. 4, in an implementation, the base 100 further includes a first connector 140; the first connector 140 includes a first sleeve 141; a flange 142 is arranged at one end of the first sleeve 141; the first sleeve 141 is plugged into the third mounting hole 124; the flange 142 abuts against an outer wall of the first mounting seat 110; and the first mounting part 123 is plugged into the first sleeve 141 and is rotatably connected to the first sleeve 141.

In this implementation, on the basis of the existing technical solution of the misting fan, the base 100 is added with the first connector 140. The adding of the first connector 140 solves the problems in mounting fit and rotation performance and further improves stability of connection between the components and smoothness of rotation.

The flange 142 is arranged at one end of the first sleeve 141 inside the first connector 140. By inserting the first sleeve 141 into the third mounting hole 124 of the first mounting seat 110, the flange 142 closely abuts against the outer wall of the first mounting seat 110. This structural design not only provides a stable mounting foundation for the first connector 140, but also effectively prevents axial displacement of the first sleeve 141 during use. Meanwhile, the first mounting part 123 is inserted into the first sleeve 141 and is rotatably connected to the first sleeve 141, so that when the fan bracket 200 rotates, the first mounting part 123 can flexibly rotate inside the first sleeve 141. Compared with a mounting hole directly formed in the first mounting seat 110 to cooperate with the first mounting part 123, the first sleeve 141 can reduce a frictional force when the first mounting part 123 rotates, reduce noise generated by friction, and avoid situations, in which the mounting hole is worn to become large and rotatable connection is loosened, due to prolonged friction.

In addition, the abutment between the flange 142 and the outer wall of the first mounting seat 110 improves radial stability of the first mounting part 123 during rotation, applies a more uniform force to the fan bracket 200 during rotation, reduces a shaking phenomenon, and ensures that the fan main body 300 and the misting assembly 500 remain stable during rotation.

Referring to FIG. 1 to FIG. 6, in an implementation, the fan bracket 200 includes a water tank 210 and a third mounting seat 220. A mounting slot 127 is provided in one side of the second mounting seat 120 away from the first mounting seat 110; and one end of the water tank 210 is detachably connected to the mounting slot 127. The third mounting seat 220 is arranged at another end of the water tank 210; the fan main body 300 is mounted on the third mounting seat 220; and a third accommodating cavity 221 is formed inside the third mounting seat 220.

The misting assembly 500 includes a spray head 510, a water inlet pipe 520, a water outlet pipe 530, a pump body 540, a controller 550, and a power source 560; the pump body 540 and the power source 560 are electrically connected to the controller 550; the pump body 540, the power source 560, and the controller 550 are all arranged inside the third accommodating cavity 221; the spray head 510 is arranged on the fan main body 300; the spray head 510 is communicated with the pump body 540 through the water outlet pipe 530; and the pump body 540 is communicated with the water tank 210 through the water inlet pipe 520.

In this implementation, the fan bracket 200 employs a combination of the water tank 210 and the third mounting seat 220. One end of the water tank 210 is detachably connected to the mounting slot 127 of the second mounting seat 120. This design allows the water tank 210 to be quickly removed when water needs to be added or cleaning is required, which greatly improves convenience for a user to maintain the equipment. Meanwhile, the water tank 210, as a component of the fan bracket 200, has a proper position layout. When a water storage function is provided, a center of gravity of the fan can also be balanced. By using a rotating structure of the base 100, the fan is more stable during rotation, and shaking caused by a center-of-gravity shift is reduced. The third mounting seat 220 carries the fan main body 300, and has the third accommodating cavity 221 inside, to mount the core components of the misting assembly 500: the pump body 540, the controller 550, and the power source 560. This integration design intensively stores key electrical components of the misting assembly 500. On the one hand, it avoids the risk such as collision with the components that are exposed and dust intrusion, effectively protects the components, and prolongs the service lives of the components. On the other hand, the regular layout makes line connection between the components more ordered, reduces problems such as line twisting and wear, and improves reliability of a circuit system. The misting assembly 500 implements stable transmission of water flow through appropriate pipeline connections. Under the control of the controller 550, the pump body 540 sucks water in the water tank 210 through the water inlet pipe 520, and then transfers the water through the water outlet pipe 530 to the spray head 510 arranged on the fan main body 300 to form mists. When the fan main body 300 rotates, the spray head 510 of the misting assembly 500 is consistent with the air outlet direction of the fan. The pump body 540, the controller 550, and the power source 560 are stably mounted inside the third accommodating cavity 221, thus ensuring stability of a misting process, avoiding problems such as pipeline looseness and water leakage that are caused by the rotation and ensuring that a misting pressure is stable. The water mists can be uniformly diffused along with the air flow of the fan, to continuously and efficiently play a role of cooling, humidification, and air purification, thereby bringing a more comfortable, convenient, and reliable user experience.

In an implementation, a second mounting part 222 and a third mounting part 223 are respectively formed on two sides of one end of the third mounting seat 220 away from the water tank 210; and two sides of the fan main body 300 are respectively rotatably connected to the second mounting part 222 and the third mounting part 223.

In an implementation, the misting assembly 500 further includes a first branch pipe 570 and a second branch pipe 580; two groups of spray heads 510 are provided; the two groups of the spray heads 510 are respectively arranged on the two sides of the fan main body 300; the first branch pipe 570 and the second branch pipe 580 are respectively arranged on the second mounting part 222 and the third mounting part 223; one end of the first branch pipe 570 is communicated with one group of spray heads 510, and another end of the first branch pipe 570 is connected with the water outlet pipe 530; one end of the second branch pipe 580 is communicated with the other group of spray heads 510; and another end of the second branch pipe 580 is communicated with the water outlet pipe 530.

Figure 4:
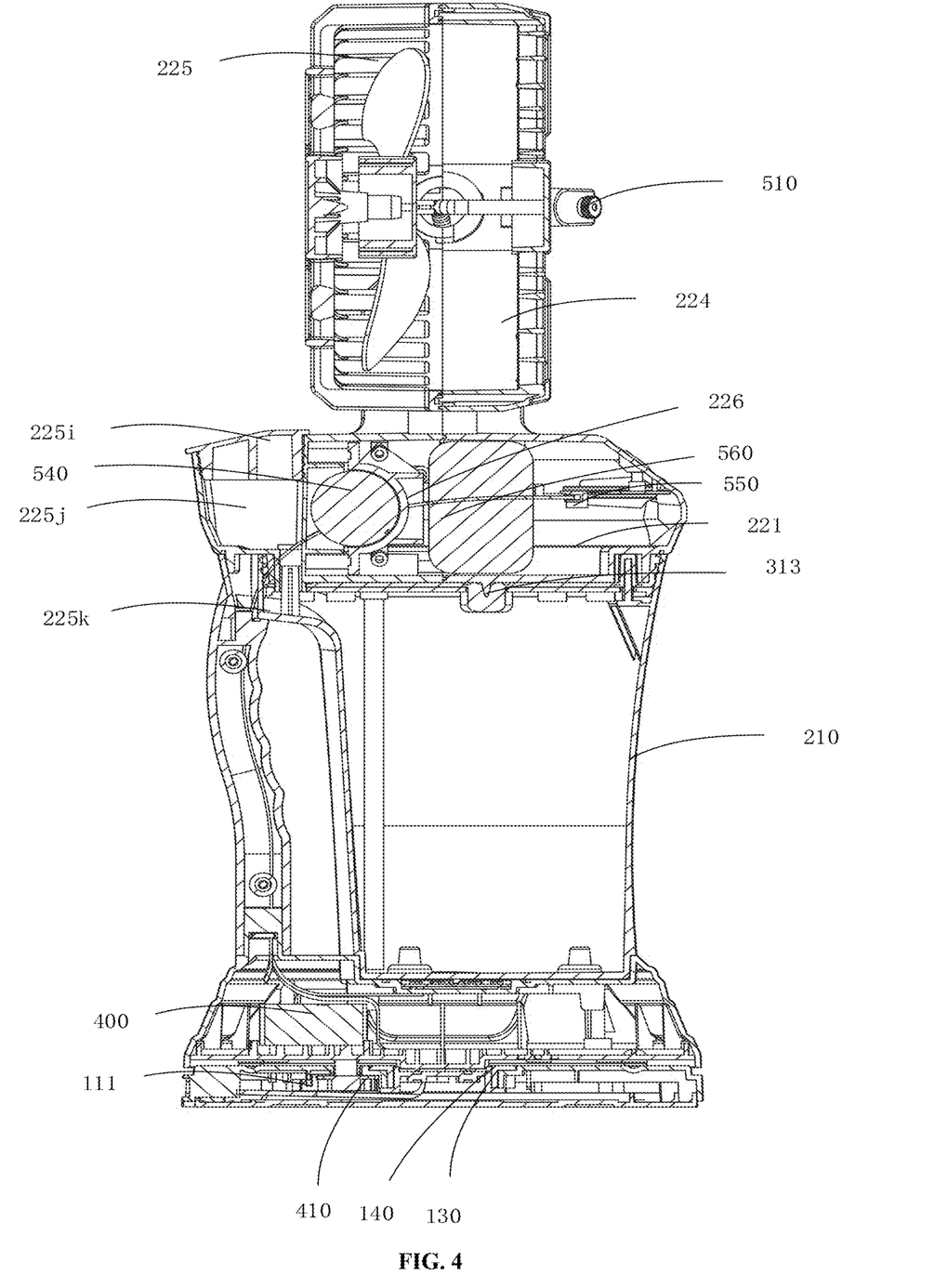
FIG. 4 is a cross-sectional view of a misting fan according to the present disclosure.
Figure 5:
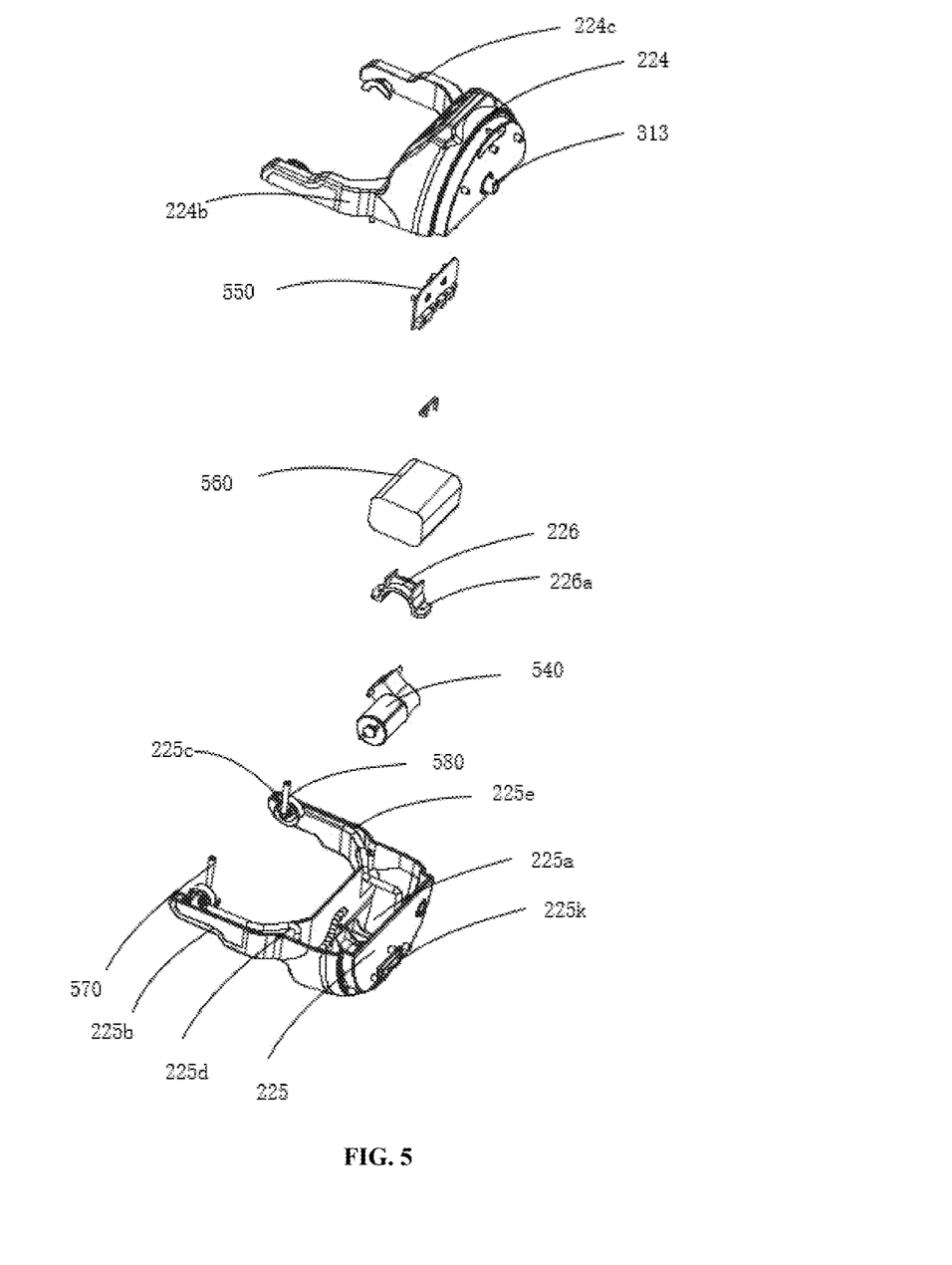
FIG. 5 is an exploded view of a third mounting seat according to the present disclosure.
Figure 6:
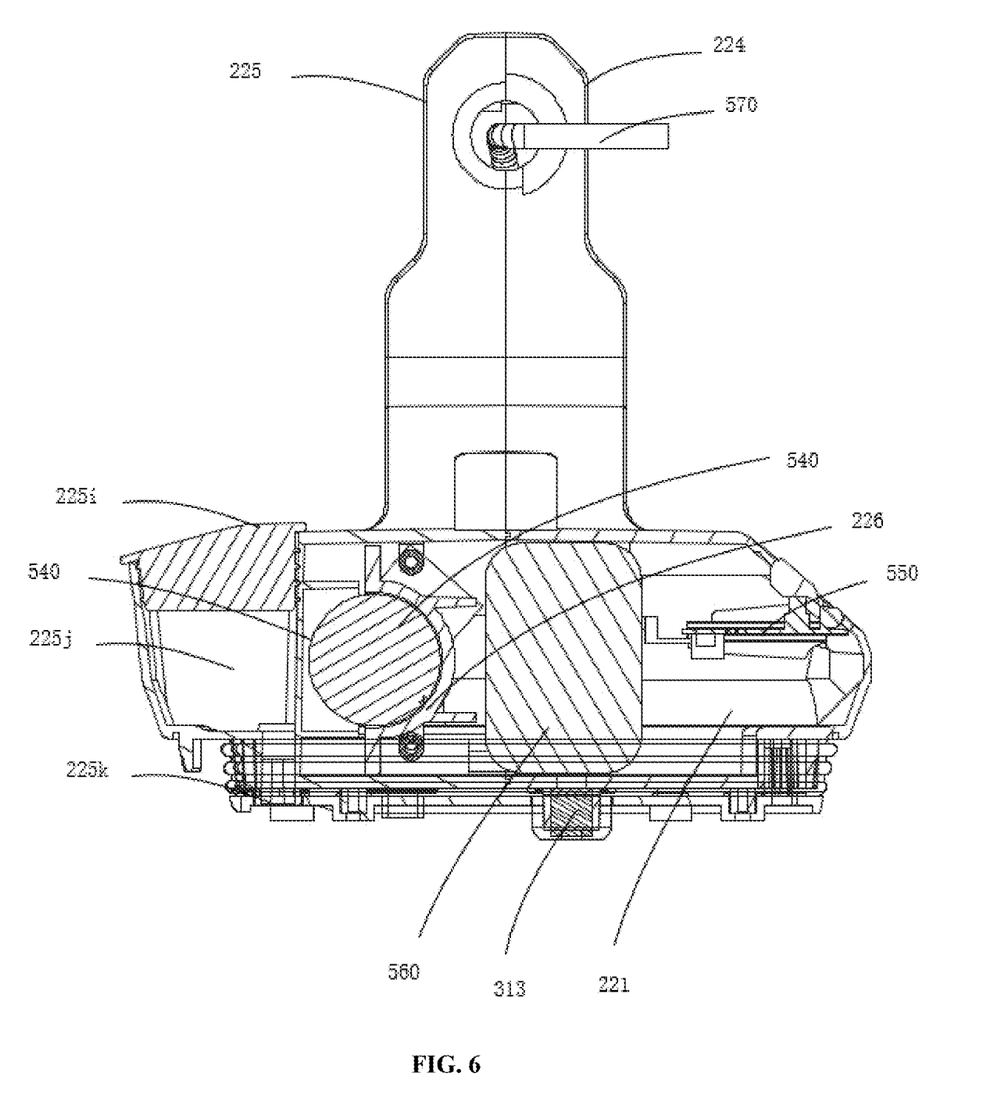
FIG. 6 is a cross-sectional view of a third mounting seat according to the present disclosure.
Figure 7:
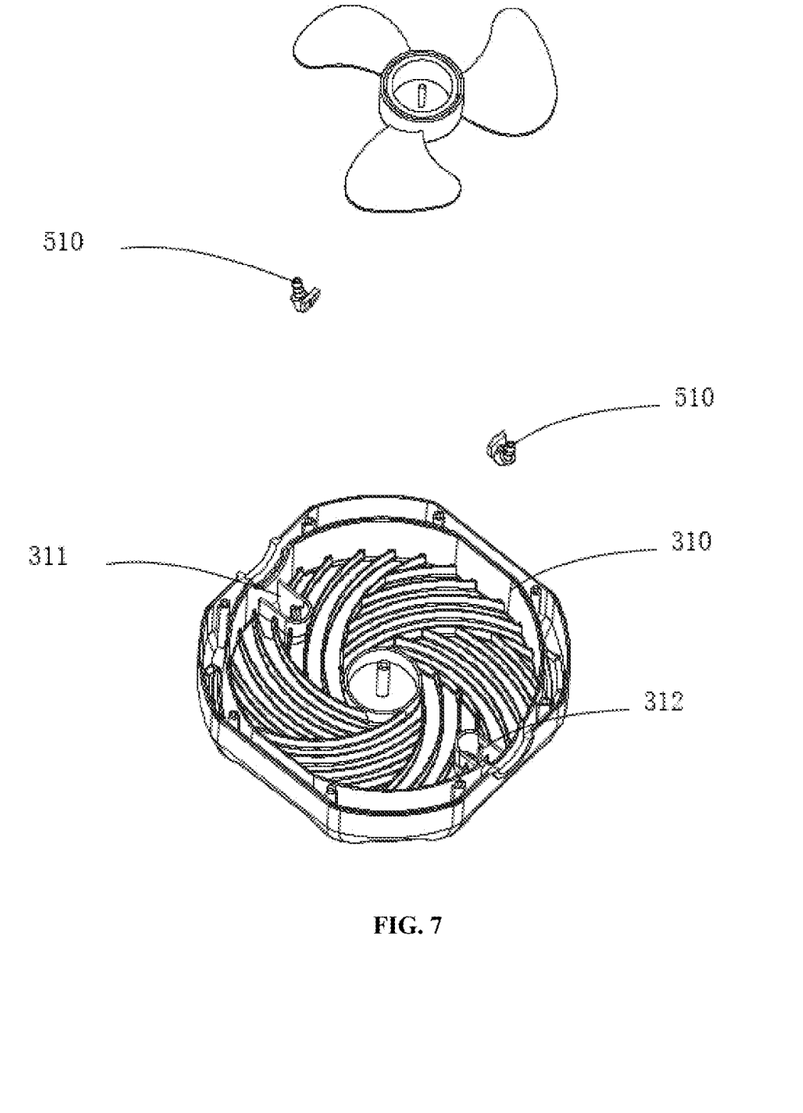
FIG. 7 is a schematic diagram of a mounting structure of a spray head according to the present disclosure.
Figure 8:
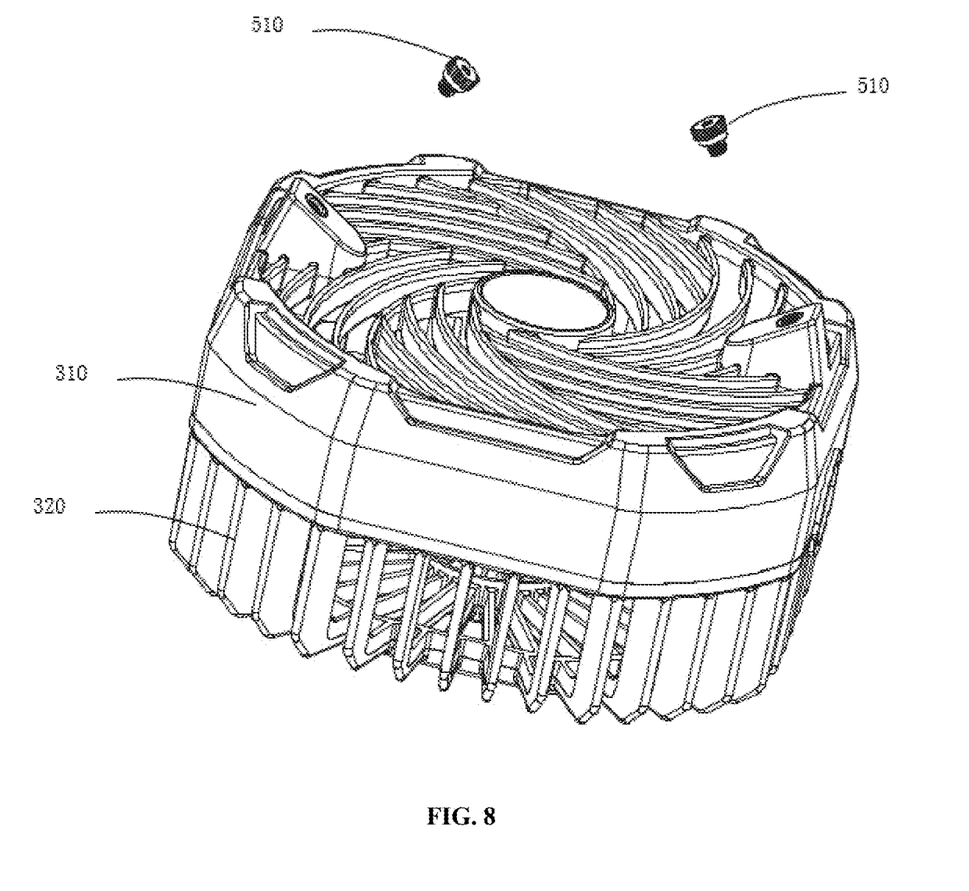
FIG. 8 is a schematic diagram of another mounting structure of a spray head according to the present disclosure.

Referring to FIG. 4 to FIG. 6, specifically, in an implementation, the third mounting seat 220 includes a first front shell 224 and a first rear shell 225; the first front shell 224 and the first rear shell 225 are detachably connected; a first cavity 224a and a second cavity 225a are respectively formed inside the first front shell 224 and the first rear shell 225; and the first cavity 224a and the second cavity 225a are enclosed to form the third accommodating cavity 221.

Referring to FIGS. 4 to 6, in one embodiment, a first extension part 224b and a second extension part 224c are formed on one side of the first front shell 224; a first accommodating slot 224d and a second accommodating slot 224e are respectively formed in the first extension part 224b and the second extension part 224c; and the first accommodating slot 224d and the second accommodating slot 224e are communicated with the first cavity 224a.

A third extension part 225b and a fourth extension part 225c are formed on one side of the first rear shell 225; a third accommodating slot 225d and a fourth accommodating slot 225e are respectively formed in the third extension part 225b and the fourth extension part 224c; and the third accommodating slot 225d and the fourth accommodating slot 225e are communicated with the second cavity 225a.

The first accommodating slot 224d and the third accommodating slot 225d are configured to store the first branch pipe 570; and the second accommodating slot 224e and the fourth accommodating slot 225e are configured to store the second branch pipe 580.

Referring to FIG. 4 to FIG. 6, specifically, in an implementation, the third mounting seat 220 includes a water pump bracket 226; a first mounting position 225f and a mounting column 225g are formed inside the second cavity 225a; the pump body 540 is arranged inside the first mounting position 225f; fourth mounting holes 226a are provided in two ends of the water pump bracket 226; a threaded hole 225h is provided in the mounting column 225g; the water pump bracket 226 is fastened to the first mounting position 225f in a manner that a bolt is in threaded connection with the threaded hole 225h through the mounting hole; and the water pump bracket 226 abuts against the pump body 540.

In this implementation, the arrangement of the water pump bracket 226 inside the third mounting seat 220 further optimizes mounting stability and reliability of the core components of the misting assembly 500. During the operation of the misting fan, the pump body 540 is a key device for driving the water flow to form mists, and its stable mounting directly affects stability and continuity of misting. The water pump bracket 226 is fixed to the first mounting position 225f by bolt fastening through the fourth mounting holes 226a in the two ends and the threaded hole 225h of the mounting column 225g in the second cavity 225a of the third mounting seat 220. This mounting mode provides a firm support structure for the pump body 540.

When the fan bracket 200 rotates under the action of the driving device 400, the water pump bracket 226 tightly abuts against the pump body 540, which can effectively limit the displacement of the pump body 540, avoid looseness or shift of the pump body 540 due to vibration or rotation inertia, and ensure that the pump body 540 always maintains a stable working state during operation. Meanwhile, this modular mounting design facilitates removal and maintenance of the pump body 540. When pump body 540 malfunctions or needs to be maintained, only the bolt needs to be removed to remove the pump bracket 226 and the pump body 540, so that the maintenance difficulty and time costs are reduced.

Referring to FIG. 1 to FIG. 8, in an implementation, the fan main body 300 includes a front fan shell 310 and a rear fan shell 320; a second mounting position 311 and a third mounting position 312 are respectively arranged on two sides of the front fan shell 310; one group of spray heads 510 are arranged in the second mounting position 311; and the other group of spray heads 510 are arranged in the third mounting position 312.

In this implementation, the spray heads 510 are respectively arranged in the second mounting position 311 and the third mounting position 312 that are on the two sides of the front fan shell 310, which further improves the functional practicability and user experience of the misting fan. The conventional misting fan often has problems of a limited coverage range and poor uniformity in misting distribution, but this design effectively improves this situation by appropriately arranging the spray heads 510. When the fan main body 300 rotates under the driving of the driving device 400, the spray heads 510 mounted on the two sides can spray the water mists outwards at a wider angle. By combining the air flow blown by the fan, the water mists can cover a larger spatial range, to achieve a better effect on both indoor large-area cooling and local region humidification and dust removal.

Meanwhile, the spray heads 510 are directly mounted in a specific mounting positions on the front fan shell 310. Compared with a loose mounting mode, this mode makes the structure more compact and more stable. During the rotation of the fan, the spray heads 510 are tightly combined with the front fan shell 310, so shaking or displacement does not easily occur, thus ensuring the accuracy of the misting direction, allowing the water mists to be mixed with the air flow and diffused, and avoiding non-uniform misting or a direction deviation caused by the looseness of the spray heads 510. In addition, this modular mounting design facilitates removal and maintenance of the spray heads 510. When a spray head 510 is blocked or fails, a user can quickly clean or replace it, thereby reducing the difficulty and costs of maintaining the equipment and further improving reliability and durability of the misting fan.

Referring to FIG. 3 to FIG. 6, in an implementation, a check valve 313 is arranged at a bottom of the first front shell 224, and the check valve 313 is communicated to an internal space of the water tank 210.

In order to improve safety and convenience of use of the misting fan, in this implementation, the check valve 313 is arranged at the bottom of the first front shell 224 and is communicated to the internal space of the water tank 210. In a scenario of using the traditional misting fan, when the equipment topples over accidentally, the water in the water tank 210 easily flows out, so that a floor can get wet, causing a cleaning problem; and a potential safety hazard such as a short circuit may also occur. Meanwhile, if air feeding is blocked during water extraction, water extraction efficiency and stability of the pump body 540 can be affected. The design of the check valve 313 solves these problems.

When the pump body 540 works to extract water from the water tank 210, the check valve 313 is opened to allow air to enter the water tank 210 smoothly, maintain a balance in an air pressure inside the water tank 210, ensure that the water flow can be stably extracted and conveyed to the spray heads 510 to form the mists, and avoid problems such as poor water extraction and misting interruption due to a negative pressure. When the fan is accidentally inverted, the check valve 313 can be automatically closed. With one-way connectivity, the check valve 313 effectively prevents the water in the water tank 210 from flowing out from the bottom of the first front shell 224, which greatly lowers the risk of water leakage, protects electrical components inside the fan, such as the pump body 540, the controller 550, and the power source 560 that are arranged inside the third accommodating cavity 221, prolongs the service life of the equipment, and eliminates safety concerns caused by the water leakage for a user. In addition, the existence of the check valve 313 does not affect water circulation of the misting assembly 500 when the fan works normally. The check valve cooperates with the water tank 210, the pump body 540, and other components to ensure that the misting fan can operate stably in various usage states and continues to achieve the functions of cooling, humidification, and air purification, thereby significantly improving practicability and user experience of the product.

Referring to FIG. 4 to FIG. 6, in order to facilitate adding water into the water tank 210, in an implementation, a water inlet 225i is provided in one end of the first rear shell 225 away from the water tank 210; a water injection channel 225j is formed inside the first rear shell 225; a water outlet 225k is provided in one end of the first rear shell 225 close to the water tank 210; the water inlet 225i, the water injection channel 225j, and the water outlet 225k are communicated in sequence; and the water outlet 225k is communicated with an internal space of the water tank 210.

In this implementation, the design of the water inlet 225i, the water injection channel 225j, and the water outlet 225k on the first rear shell 225 improves convenience and user experience of adding water into the water tank 210 of the misting fan. During the use of the traditional misting fan, to add water into the water tank 210, the entire equipment often needs to be moved to a water source, or the water tank 210 can be opened only through a complicated removal operation. The operation is tedious, and the water leakage easily occurs in the water adding process. Furthermore, in this design, the water injection channel 225j is integrated into the first rear shell 225 by forming the water inlet 225i in one end of the first rear shell 225 away from the water tank 210, and the water outlet 225k communicated to the water tank 210 formed in the end close to the water tank 210, thus forming a concealed and efficient water adding path.

When a user needs to add water, the user only needs to align the water source with the water inlet 225i on the first rear shell 225, and the water will naturally flow into the water tank 210 through the water injection channel 225j, without disassembling the fan main body 300 or moving the entire equipment. This greatly simplifies the water adding procedure. Meanwhile, the design of communication between the water injection channel 225j and the water outlet 225k ensures that the water flow can be smoothly transferred from the water inlet 225i to the water tank 210, thus avoiding a difficulty in adding water due to channel blockage or poor water flowing. In addition, the water inlet 225i is formed in the end of the first rear shell 225 away from the water tank 210, which is convenient for user operation and can effectively prevent water droplets from splashing onto the electrical components inside the fan in the water adding process, such as the controller 550 and the power source 560 that are arranged inside the third accommodating cavity 221, thereby ensuring safety of use of the equipment.

This integrated water adding structure is integrated with the overall design of the misting fan, which solves the problem of inconvenient water adding without increasing the volume or complexity of the equipment. With the function of the check valve 313 for preventing water leakage when the water tank 210 is inverted, the practicality and reliability of the equipment are further improved. During use, a user can easily replenish water for the water tank 210 at any time to ensure that the misting assembly 500 works continuously and stably.

Referring to FIG. 1 to FIG. 8, in an implementation, the water tank 210 is made of a light-transmittance material; and a light-emitting assembly 600 is arranged on one side of the second mounting seat 120 opposite to the water tank 210.

In this implementation, due to the design in which the water tank 210 is made of the light-transmittance material and the light-emitting assembly 600 is arranged on the side corresponding to the second mounting seat 120, functionality of the misting fan is improved, and the product is endowed with a better visual experience. In a scenario of using the traditional misting fan, it is often difficult for a user to intuitively determine a water level in the water tank 210. This may affect a misting effect due to water shortage, or even damage the components such as the pump body 540. By applying the water tank 210 made of the light-transmittance material, a user can directly observe a water level state inside the water tank 210 and timely perform a water replenishment operation, thereby avoiding damage to the equipment caused by idling due to water shortage and prolonging the service life of the equipment.

The arrangement of the light-emitting assembly 600 further improves the practicality and aesthetics of the product. When the misting fan works, light emitted by the light-emitting assembly 600 passes through the light-transmittance water tank 210. On the one hand, it can provide a lighting function in a dark environment, which is convenient for a user to use the equipment at night or in a case of insufficient light. On the other hand, interactions between the light and the water inside the water tank 210 creates a soft light and shadow effect, which adds visual attraction to the product and improves an overall texture and user experience of the product. In addition, the light of the light-emitting assembly 600 can also play a particular sterilization role on the water in the water tank 210, to help to keep the water in the water tank 210 clean, reduce bacteria breeding, and making the mists healthier and more environmentally friendly.

By this innovative structure which combines the practical functions with the aesthetic design, the misting fan is not only functional equipment, but also a decorative element for an indoor environment. The synergistic effect of the light-transmittance water tank 210 and the light-emitting assembly 600 meets needs of a user for convenience and reliability of use of the equipment, and improves market competitiveness of the product through a unique visual effect, thus bringing a more comfortable, beautiful, and practical user experience.

According to the technical solutions of the present disclosure, the arc-shaped driven member 111 is arranged on the first mounting seat 110. One end of the second mounting seat 120 is arranged on the first mounting seat 110 and is rotatably connected to the first mounting seat 110. The driving device 400 is arranged on one end of the second mounting seat 120 opposite to the first mounting seat 110. The transmission member 410 is arranged at the output end of the driving device 400. The transmission member 410 is meshed with the arc-shaped driven member 111. The fan bracket 200 is arranged at another end of the second mounting seat 120. This can achieve automatic reciprocating swinging or fixed-point rotation of the fan and has low noise in the meshing transmission between the arc-shaped driven member 111 and the transmission member 410. With the smooth rotation, a silence experience of a user during use can be enhanced.

The above descriptions are only preferred embodiments of the present invention, and are not intended to limit the patent scope of the present invention. Any equivalent structural transformation made by using the content of the specification and the drawings of the present invention under the invention idea of the present invention, directly or indirectly applied to other related technical fields, shall all be included in the scope of patent protection of the present invention.

What is claimed is:

1. A misting fan, comprising:
   a base;
   a fan bracket, wherein one end of the fan bracket is arranged on the base and is rotatably connected to the base; a fan main body is arranged at another end of the fan bracket;
   a driving device, wherein the driving device is arranged on the base, is connected to the fan bracket, and is configured to drive the fan bracket to rotate; and
   a misting assembly, wherein the misting assembly is arranged on the fan main body, and a misting direction of the misting assembly is the same as an air outlet direction of the fan main body;
   wherein the base comprises:
   a first mounting seat, wherein an arc-shaped driven member is arranged on the first mounting seat; and
   a second mounting seat, wherein one end of the second mounting seat is arranged on the first mounting seat and is rotatably connected to the first mounting seat; the driving device is arranged at one end of the second mounting seat opposite to the first mounting seat; a transmission member is arranged at an output end of the driving device; the transmission member is meshed with the arc-shaped driven member; and
   the fan bracket is arranged at another end of the second mounting seat;
   wherein a first accommodating cavity is formed in the first mounting seat; the arc-shaped driven member is arranged in the first accommodating cavity; the first accommodating cavity is provided with an avoidance slot at an edge of the arc-shaped driven member; a first mounting hole corresponding to an output end of the driving device is provided in one side of the first mounting seat opposite to the second mounting seat; the first mounting hole is communicated with the first accommodating cavity; the output end of the driving device extends out of the first mounting hole and the avoidance slot in sequence into the first accommodating cavity; and the transmission member is arranged at a tail end of the output end of the driving device.

2. The misting fan according to claim 1, wherein a second accommodating cavity is formed inside the second mounting seat; the driving device is arranged in the second accommodating cavity; a second mounting hole is provided in one side of the second mounting seat opposite to the first mounting seat; the second mounting hole is communicated with the second accommodating cavity; and the output end of the driving device is at least partially threaded out of the second mounting hole.

3. The misting fan according to claim 2, wherein a first mounting part is further arranged on the side of the second mounting seat opposite to the first mounting seat; a third mounting hole corresponding to the first mounting part is provided in the first mounting seat; and the first mounting part is rotatably connected to the third mounting hole.

4. The misting fan according to claim 1, wherein a support member is further arranged on one side of the second mounting seat opposite to the first mounting seat; a sliding chute is provided in the side of the first mounting seat opposite to the second mounting seat; and the support member is slidably connected to the sliding chute.

5. The misting fan according to claim 4, wherein the support member is a ball; a groove is further provided in the side of the second mounting seat opposite to the first mounting seat; the ball is arranged in the groove; a cross section of the sliding chute is arc-shaped to form a roller path; and the ball is in rolling connection with the roller path.

6. The misting fan according to claim 3, wherein the base further comprises a stopper; the stopper comprises a first convex part; the first convex part is arranged inside the third mounting hole in a penetrating manner and is rotatably connected to the third mounting hole; one end of the first convex part is detachably connected to the first mounting part; a first limiting part is arranged at another end of the first convex part; and an outer diameter of the first limiting part is greater than a diameter of the third mounting hole.

7. The misting fan according to claim 3, wherein a second convex part is arranged on one side of the first mounting part opposite to the first convex part; a first through hole is provided in the second convex part; the first convex part is provided with a second through hole corresponding to the first through hole; the second convex part is plugged into the second through hole; and the first through hole and the second through hole are configured to allow a wire to pass through.

8. The misting fan according to claim 3, wherein the base further comprises a first connector; the first connector comprises a first sleeve; a flange is arranged at one end of the first sleeve; the first sleeve is plugged into the third mounting hole; the flange abuts against an outer wall of the first mounting seat; and the first mounting part is plugged into the first sleeve and is rotatably connected to the first sleeve.

9. A misting fan, comprising:
   a base;
   a fan bracket, wherein one end of the fan bracket is arranged on the base and is rotatably connected to the base; a fan main body is arranged at another end of the fan bracket;
   a driving device, wherein the driving device is arranged on the base, is connected to the fan bracket, and is configured to drive the fan bracket to rotate; and
   a misting assembly, wherein the misting assembly is arranged on the fan main body, and a misting direction of the misting assembly is the same as an air outlet direction of the fan main body;
   wherein the base comprises a first mounting seat and a second mounting seat, one end of the second mounting seat is arranged on the first mounting seat and is rotatably connected to the first mounting seat;

wherein the fan bracket comprises:
a water tank, wherein a mounting slot is provided in one side of the second mounting seat away from the first mounting seat; one end of the water tank is detachably connected to the mounting slot;
a third mounting seat, wherein the third mounting seat is arranged at another end of the water tank; the fan main body is mounted on the third mounting seat; a third accommodating cavity is formed inside the third mounting seat;
the misting assembly comprises two groups of spray heads, a water inlet pipe, a water outlet pipe, a pump body, a controller, and a power source; the pump body and the power source are electrically connected to the controller; the pump body, the power source, and the controller are all arranged inside the third accommodating cavity; the two groups of spray heads are arranged on the fan main body; the two groups of spray heads are communicated with the pump body through the water outlet pipe; and the pump body is communicated with the water tank through the water inlet pipe.

10. The misting fan according to claim 9, wherein a second mounting part and a third mounting part are respectively formed on two sides of one end of the third mounting seat away from the water tank; and two sides of the fan main body are respectively rotatably connected to the second mounting part and the third mounting part.

11. The misting fan according to claim 10, wherein the misting assembly further comprises a first branch pipe and a second branch pipe; the two groups of the spray heads are respectively arranged on the two sides of the fan main body; the first branch pipe and the second branch pipe are respectively arranged on the second mounting part and the third mounting part; one end of the first branch pipe is communicated with one group of spray heads, and another end of the first branch pipe is connected with the water outlet pipe; one end of the second branch pipe is communicated with the other group of spray heads; and another end of the second branch pipe is communicated with the water outlet pipe.

12. The misting fan according to claim 10, wherein the third mounting seat comprises a first front shell and a first rear shell; the first front shell and the first rear shell are detachably connected; a first cavity and a second cavity are respectively formed inside the first front shell and the first rear shell; and the first cavity and the second cavity are enclosed to form the third accommodating cavity.

13. The misting fan according to claim 12, wherein a first extension part and a second extension part are formed on one side of the first front shell; a first accommodating slot and a second accommodating slot are respectively formed in the first extension part and the second extension part; the first accommodating slot and the second accommodating slot are communicated with the first cavity;
a third extension part and a fourth extension part are formed on one side of the first rear shell; a third accommodating slot and a fourth accommodating slot are respectively formed in the third extension part and the fourth extension part; the third accommodating slot and the fourth accommodating slot are communicated with the second cavity;
the first accommodating slot and the third accommodating slot are configured to store the first branch pipe; and the second accommodating slot and the fourth accommodating slot are configured to store the second branch pipe.

14. The misting fan according to claim 12, wherein the third mounting seat comprises a water pump bracket; a first mounting position and a mounting column are formed inside the second cavity; the pump body is arranged inside the first mounting position; fourth mounting holes are provided in two ends of the water pump bracket; a threaded hole is provided in the mounting column; the water pump bracket is fastened to the first mounting position in a manner that a bolt is in threaded connection with the threaded hole through the mounting hole; and the water pump bracket abuts against the pump body.

15. The misting fan according to claim 12, wherein the fan main body comprises a front fan shell and a rear fan shell; a second mounting position and a third mounting position are respectively arranged on two sides of the front fan shell; one group of spray heads are arranged in the second mounting position; and the other group of spray heads are arranged in the third mounting position.

16. The misting fan according to claim 12, wherein a check valve is arranged at a bottom of the first front shell; and the check valve is communicated with an internal space of the water tank.

17. The misting fan according to claim 12, wherein a water inlet is provided in one end of the first rear shell away from the water tank; a water injection channel is formed inside the first rear shell; a water outlet is provided in one end of the first rear shell close to the water tank; the water inlet, the water injection channel, and the water outlet are communicated in sequence; and the water outlet is communicated with an internal space of the water tank.

18. The misting fan according to claim 12, wherein the water tank is made of a light-transmittance material; and a light-emitting assembly is arranged on one side of the second mounting seat opposite to the water tank.

* * * * *